United States Patent [19]

Kim

[11] Patent Number: 4,984,838
[45] Date of Patent: Jan. 15, 1991

[54] DETACHABLE AUTOMOBILE FLOOR MAT HAVING A DETACHABLE FOOTREST

[76] Inventor: Hyun G. Kim, 115-295, Mun Won-Dong, Gwa Chun, Kyungki-Do, Rep. of Korea

[21] Appl. No.: 479,371

[22] Filed: Feb. 13, 1990

[30] Foreign Application Priority Data

Feb. 17, 1989 [KR] Rep. of Korea ..................... 1636/89

[51] Int. Cl.⁵ .............................................. B60N 3/06
[52] U.S. Cl. .................................. 296/75; 296/97.23
[58] Field of Search ............................. 296/75, 97.23; 180/90.6

[56] References Cited

U.S. PATENT DOCUMENTS

| | | | |
|---|---|---|---|
| 3,047,088 | 7/1962 | Murrell | 296/75 X |
| 3,860,284 | 1/1975 | Lichtig | 296/75 |
| 4,726,438 | 2/1988 | Stuertz et al. | 296/75 X |

FOREIGN PATENT DOCUMENTS

| | | | |
|---|---|---|---|
| 1298889 | 7/1969 | Fed. Rep. of Germany | 296/75 |
| 3730280 | 12/1988 | Fed. Rep. of Germany | 296/75 |
| 58-48904 | 8/1983 | Japan . | |

*Primary Examiner*—Dennis H. Pedder
*Assistant Examiner*—Gary C. Hoge
*Attorney, Agent, or Firm*—Limbach, Limbach & Sutton

[57] ABSTRACT

An automobile mat for the floor position of the driver of an automobile which comprises a mat configured to be received on the floor area used by the feet of the driver of the automobile. A footrest having a top and a bottom with the top receives thereon during use the driver's foot positioned opposite the accelerator of the automobile such that the foot is supported above the floor of the automobile at a height and angle proximating the height and angle of the foot of the driver when manipulating the accelerator. A fixing means detachably and simultaneously secures during use the footrest to the mat and to the floor of the automobile to aid in preventing the mat from sliding along the surface of the floor of the automobile.

11 Claims, 3 Drawing Sheets

DETACHABLE AUTOMOBILE FLOOR MAT HAVING A DETACHABLE FOOTREST

BACKGROUND OF THE INVENTION

Field of Invention

This invention relates to a detachable automobile floor mat having a footrest, and more particularly, to a detachable automobile floor mat, having a footrest, which aids in keeping the driver's position comfortable and stable to aid the driver in maintaining a safe driving position. The invention further relates to a detachable mat for passenger use to aid in making the passenger(s) more comfortable.

U.S. Pat. No. 3,860,284 teaches a safety device for use with an automobile. This device is a block of compressible material which is placed on the floorboard of an automobile to aid the user thereof in maintaining his position during rapid deceleration, i.e. hard braking.

Japanese Patent Publication No. 58-48904 (1983) teaches an adjustable footrest which enables the angle of the footrest to be changed relative to the floorboard.

For those automobiles which include an immoveable footrest which protrudes from the floorboard, it is impossible to achieve the desired purposes of the present invention since the foot positioned thereat is able to rest at only a single position.

Considering the structure of the floor where the driver's feet are placed, the clutch pedal, the brake pedal and the accelerator pedal are positioned side by side on the inclined portion of the floor of the car. Except for the time the driver is shifting the gears of the car, one foot of the driver is positioned on the accelerator pedal and the other foot is positioned on the floor of the car. In this case, since the foot positioned on the accelerator pedal and the other foot positioned on the inclined portion of the floor are not at the same level relative to the floor and since the difference between the height of one foot from the floor and that of the other foot from the floor is very large, for example, approximately 10 Cm, the driver does not feel comfortable and tires easily. Under this situation, if the driver needs to step on the clutch pedal suddenly, it is very difficult for the driver to perform such an instantaneous reflex action due to the height difference, for example about 10 Cm, between the foot positioned on the floor and the clutch pedal.

In the case of a car with an automatic transmission, since there is no clutch pedal, one foot of the driver is always positioned on the floor. Accordingly, there is a height difference between the left and the right foot of the driver which may contribute to the driver's fatigue.

When a conventional floor mat is placed on the floor of the car, the front edge of the floor mat usually works its way into one or more of the pedals (accelerator pedal, brake pedal and clutch pedal), such that a portion of the mat may then be jammed between the floor of the car and the levers of the three pedals. As described above, if a portion of the floor mat becomes jammed between the floor of the car and one or more of the pedals, the operation of these pedals is impaired which may be very dangerous to driver and passenger.

Therefore, it is an object of the present invention to provide an attachable automobile floor mat having a footrest which aids in keeping the a driver's position comfortable and can be attached to the floor of a car in order to prevent the undesirable movement of the floor mat.

It is another object of the present invention to provide a detachable floor mat for an automobile which is convenient for the driver and does not interfere with the operation of the pedals.

It is another object of the present invention to provide a detachable automobile floor mat having a foot rest for each passenger floor area.

It is another object of the present invention to provide a mat which can be simultaneously used with a footrest and which aids in securing the mat against sliding along the surface of the floor of an automobile.

It is another object of the present invention to provide a mat which enables the foot positioned opposite the accelerator of the automobile to attain a similar incline as the foot manipulating the accelerator without requiring the driver to consciously maintain a steady pressure on the footrest to achieve such incline.

It is another object of the present invention to provide a mat which utilizes a fixing means in combination with a notch or aperture to secure the footrest to the mat while simultaneously securing the mat to the floor of the automobile through the notch or aperture.

It is another object of the present invention to provide a mat which is detachable from the floor of the automobile for easy cleaning of both the mat and the floor.

SUMMARY OF THE INVENTION

For purposes of summarizing the invention it relates to an automobile mat which covers the floor position used by the driver of an automobile and also provides for a footrest. The automobile mat of the present invention comprises a mat configured to be received on the floor area used by the feet of the driver of the automobile A footrest having a top and a bottom with the top for receiving thereon in use the driver's foot which is positioned opposite the accelerator of the automobile such that the foot may be supported above the floor of the automobile at a height approximating the height of the foot of the driver when manipulating the accelerator. A fixing means detachably and simultaneously secures in use the footrest to the mat and to the floor of the automobile to thereby aid in preventing the mat from sliding along the surface of the floor of the automobile.

The mat of the present invention preferably includes a footrest which includes a top having a convex shape which in use upon movement of the foot of the driver along the convex surface of the footrest proximates the incline of the accelerator pedal being manipulated by the other foot of the driver.

Preferably, the fixing means is a hook fabric and a loop fabric known as VELCRO (Registered Trademark) with the mat further including a notch formed therein such that in use the notch is juxtaposed the accelerator. Either the hook or the loop fabric is positioned on the mat, preferably, proximate the notch and also on the floor or carpet of the automobile. That is, one of the hook and loop fabrics includes a first and a second portion with the first portion secured to the floor and the second portion secured to the mat. The fabric other that the fabric attached to the floor and mat above, is secured to the footrest such that in use upon positioning the mat on the floor area of the automobile used by the driver, the notch receives the first portion of the fabric positioned on the floor to enable the fabric secured to the bottom of the footrest to securely engage the fabric positioned on the floor and the fabric positioned on the mat thereby detachably and simultaneously securing in use the bottom of the footrest to the mat and to the floor of the automobile to thereby aid in preventing the mat from sliding along the surface of the floor of the automobile.

The present invention also includes a rear seat automobile floor mat which comprises a mat having a top and a bottom and configured to be received on the floor area used by the feet of a passenger positioned in the rear seat of the automobile. A footrest for receiving thereon in use the passenger's feet is positioned at the top of the mat such that the feet may be supported above the floor of the automobile by the footrest. A fixing means for detachably securing in use the footrest to the mat is fastened to the mat. Preferably, the fixing means is a hook fabric and a loop fabric, known as VELCRO.

Preferably, one of the hook and loop fabrics includes a first and a second portion with the first portion secured to the floor and the second portion secured to the mat and the remaining fabric secured to the footrest. The mat further includes an aperture formed in the top of the mat such that in use upon positioning the mat on the floor area of the automobile used by the passenger the aperture receives the first portion of the fabric positioned on the floor to enable the fabric secured to the bottom of the footrest to securely engage the fabric positioned on the floor and the mat thereby detachably and simultaneously securing in use the bottom of the footrest to the mat and to the floor of the automobile to thereby aid in preventing the mat from sliding along the surface of the floor of the automobile.

The rear seat passenger mat may also include a first and a second opening formed on the top of the mat for receiving in use a first and a second front seat support present in certain automobiles. These openings ensure that the mat will not slide under the front seat of the automobile. That is, once the supports of the front seat are positioned into the openings of the mat, the mat is stabilized against sliding.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For fuller understanding of the nature and objects of the invention, reference should be made to the following detailed description taken in conjunction with the accompanying drawings in which.

The novel feature of the present invention may be understood from the accompanying description when taking in conjunction with the accompanying drawings.

DETAILED DESCRIPTION OF THE DRAWINGS

Figure 1A:
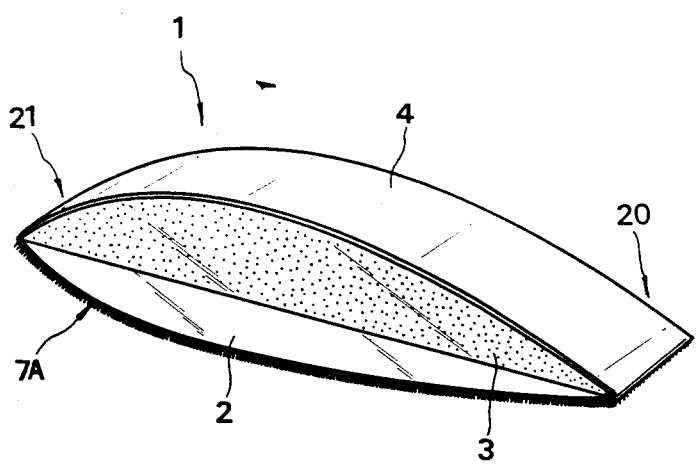
FIG. 1A illustrates a perspective view of the footrest according to the present invention.

FIG. 1A illustrates a perspective view of the footrest 1 according to the present invention.

Figure 1B:
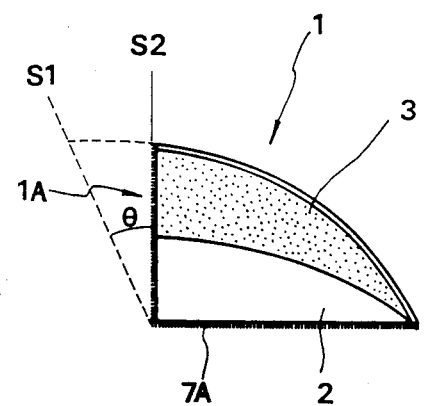
FIG. 1B illustrates a sectional view of an other embodiment of the present invention.
Figure 1C:
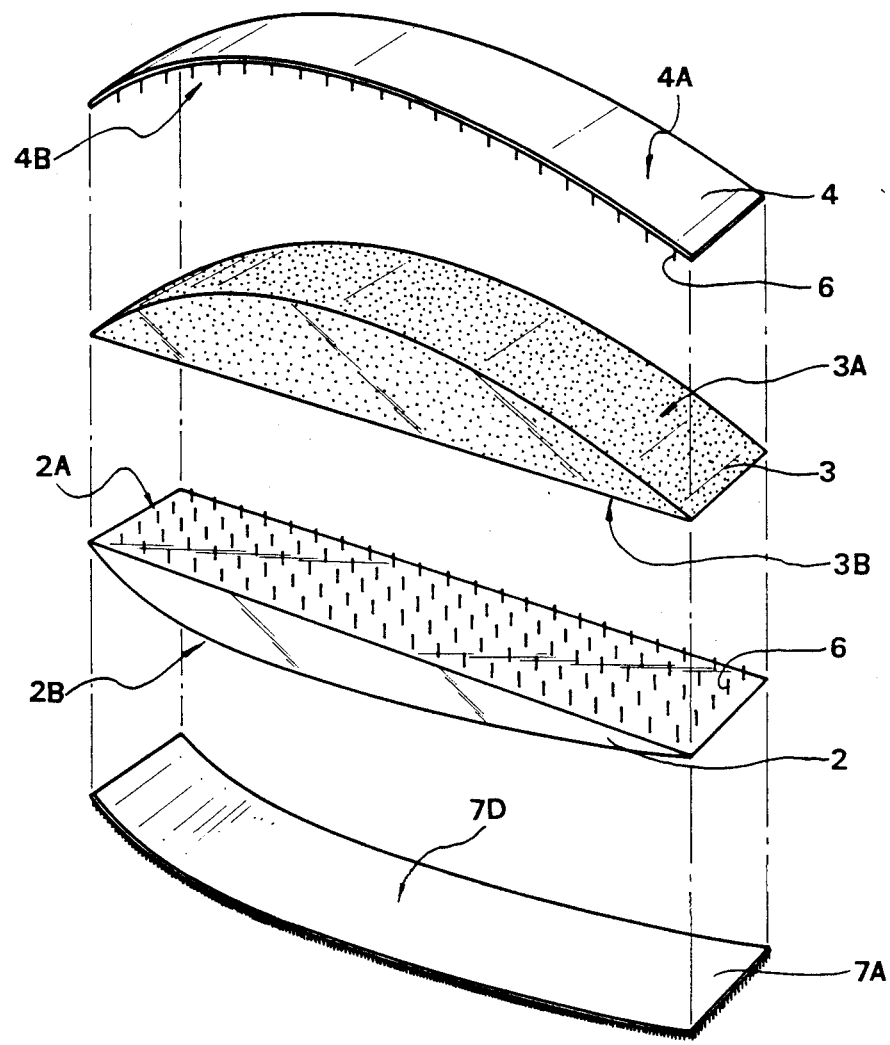
FIG. 1C illustrates an explode view of FIG. 1A.

FIG. 1C illustrates a disassembled view of the structure of a footrest 1 according to the present invention.

The footrest 1 preferably has a laminated structure comprising a bottom member 2 composed of a rubber or a synthetic resin, an intermediate member 3 composed of a sponge material and a top member 4 composed of a non-skid rubber.

The bottom member 2 is made of, for example, a rubber or a synthetic resin, for maintaining the height and shape of the footrest 1. The bottom member must be sufficiently rigid since it provides the structure which maintains the position of the mat by cooperation with the fixing means. When the three members are assembled, the height of the footrest 1 is about 5 to 10 Cm so as to approximate the height of an accelerator pedal from the floor of a car.

The intermediate member 3 made of, for example, a sponge material, is inserted between the bottom member 2 and the top member 4 so that the footrest is elastic and flexible. The thickness of the intermediate member 3 may vary depending upon a driver's physical condition or desire.

The top member 4 is made of, for example, a soft rubber and the top surface 4A of the top member 4 may further include a plurality of protrusions to aid in preventing the driver's foot from slipping off the footrest when positioned on top member 4.

The bottom surface 4B of the top member 4 and the top surface 2A of the bottom member 2 may also comprise a plurality of protrusions 6 for securing members 2 and 4 on intermediate member 3. Both surfaces 2A and 4B are attached to surfaces 3B and 3A of the intermediate member 3, respectively, by using an adhesive, thereby preventing separation of each member when a pressing force is exerted on the footrest 1 by stepping thereon.

It should be noted that the laminated structure comprising the top member 4, the intermediate member 3 and the bottom member 2 can be made in a single unit with the same material. However, such material must be structurally able to resist the forces acting on the mat to move the mat since such material links the mat to the floor. If the bottom member is too weak, the mat will move notwithstanding the attachment to the floor since the bottom member would yield by folding, for example.

A fixing means 7 includes the hooks of VELCRO 7A (Registered Trade Mark) attached to the bottom surface 2B of the bottom member 2 and the loops of VELCRO 7B, 7C being attached to the automobile floor mat 8 and/or the floor 8A of the car, respectively, so that the footrest 1 is detachable to assist in cleaning the floor of the car and to enable the footrest to be positioned on the loops of the VELCRO 7B, 7C according to the desires of the driver. The position of the hook and loop fabric of VELCRO is interchangeable as long as attachment is obtained.

Figure 2:
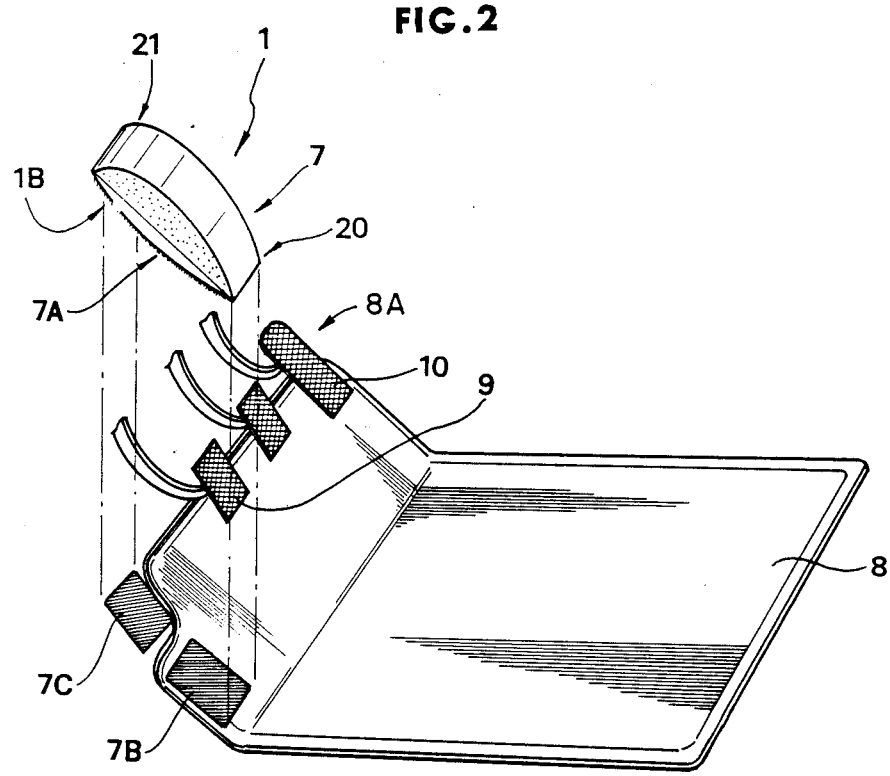
FIG. 2 illustrates a footrest and two fixing means for fixing a footrest according to the present invention.

After each element is assembled and fixed to each other to form the footrest 1, a portion of the footrest 1 may be cut away to form a front face IA depending upon the desired shape and on the angle of the inclined floor in the car, that is, an angle formed between a solid line S2 and a dotted line S1 shown in FIG. 1B. In this embodiment the fire wall of the vehicle, such as a truck, meets the floor at about a 90 degree angle. In this case VELCRO 7C is secured to the fire wall such that the VELCRO 7A at S2 cooperates therewith. The VELCRO 7A at the bottom of bottom member 2 cooperates with the VELCRO 7B which is secured to the mat. FIG. 2 illustrates a footrest 1 and VELCRO loops 7B and 7C for securing the footrest 1 when the hooks 7A of the footrest 1 is positioned on the loops 7B and 7C.

As described above in conjunction with FIG. 1, the fixing means 7, for example, hooks 7A of VELCRO are attached to the bottom surface 1B of the bottom member 2. Then, the loops 7B of VELCRO are attached to a portion of the automobile floor mat 8 placed on the floor of the car and loops 7C of VELCRO are also attached to a portion of the floor 8A of the car, respectively, with the hooks cooperating with the loops to fix the footrest 1 in place. As illustrated in FIG. 2, a portion of footrest 1 is attached to the floor 8A of the car and a portion is attached to the automobile floor mat 8, thereby aiding in preventing the automobile floor mat 8 from sliding out of position along the floor 8A of the car. Thus, even though the driver moves his feet, the automobile floor mat 1 does not move so that the incidence of jamming the automobile floor mat between the floor of the car and the levers of the pedals is prevented, thereby offering added safety.

Figure 3:
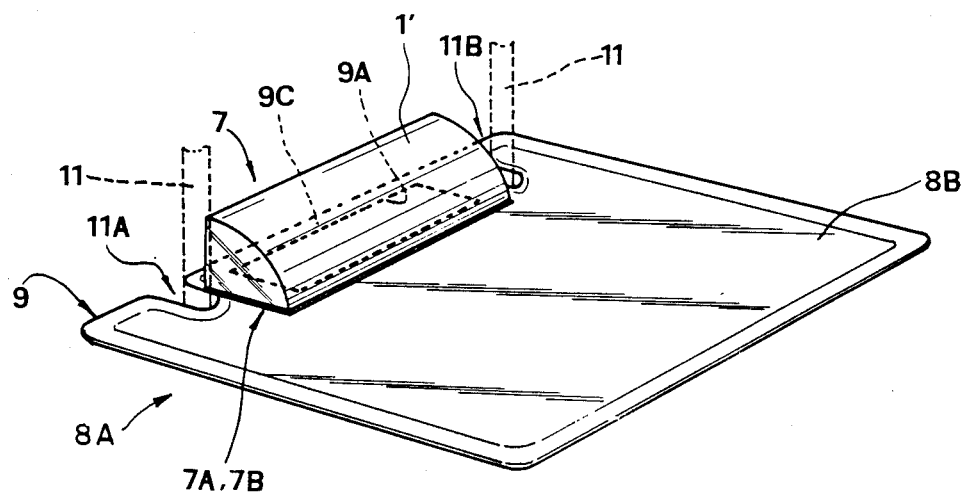
FIG. 3 illustrates another embodiment of the present invention.

FIG. 3 illustrates another embodiment of the present invention and shows that the footrest 1 according to the present invention can be positioned in conjunction with the passenger seat in the car as well as the driver's seat. For example, it is the same for the back seat that a floor mat is moveable by the passenger's feet. Thus, if the floor mat 8B having longer footrest 1' according to the present invention is placed between two front seat supports 11, the floor mat cannot be moved by the passenger's feet and the passenger on the car feels comfortable since the mat provides a static footrest 1' on which he may put his feet.

Preferably, the rear seat passenger mat fixing means 7 is a hook fabric and a loop fabric, more commonly known as VELCRO, with the mat further including an aperture 9A formed in the top 9 of the mat 8B. Either the hook or the loop fabric is positioned on the mat, preferably, proximate the aperture, and most preferably around the perimeter 9C of the aperture 9A, and also on the floor or carpet of the automobile. That is, one of the hook and loop fabrics includes a first and a second portion with the first portion secured to the floor and the second portion secured to the mat. The fabric other than the fabric attached to the floor and mat above, is secured to the footrest such that in use upon positioning the mat on the floor area of the automobile used by the rear seat passenger, the aperture receives the first portion of the fabric positioned on the floor to enable the fabric secured to the bottom of the footrest to securely engage the fabric positioned on the floor and the fabric positioned on the mat thereby detachably and simultaneously securing in use the bottom of the footrest to the mat and to the floor of the automobile to thereby aid in preventing the mat from sliding along the surface of the floor of the automobile.

The mat may further include a first 11A and a second 11B opening formed at the top of the mat for receiving in use a first 11 and a second 11 front seat support.

Also, for the seat next to the driver's seat, it is possible to place a floor mat having two footrests 1 according to the present invention with one being positioned on the left front edge of the floor mat and the other being positioned on the right front edge of the floor mat. Such a floor mat having two footrests positioned as described above may also be positioned for other seats.

Figure 4:
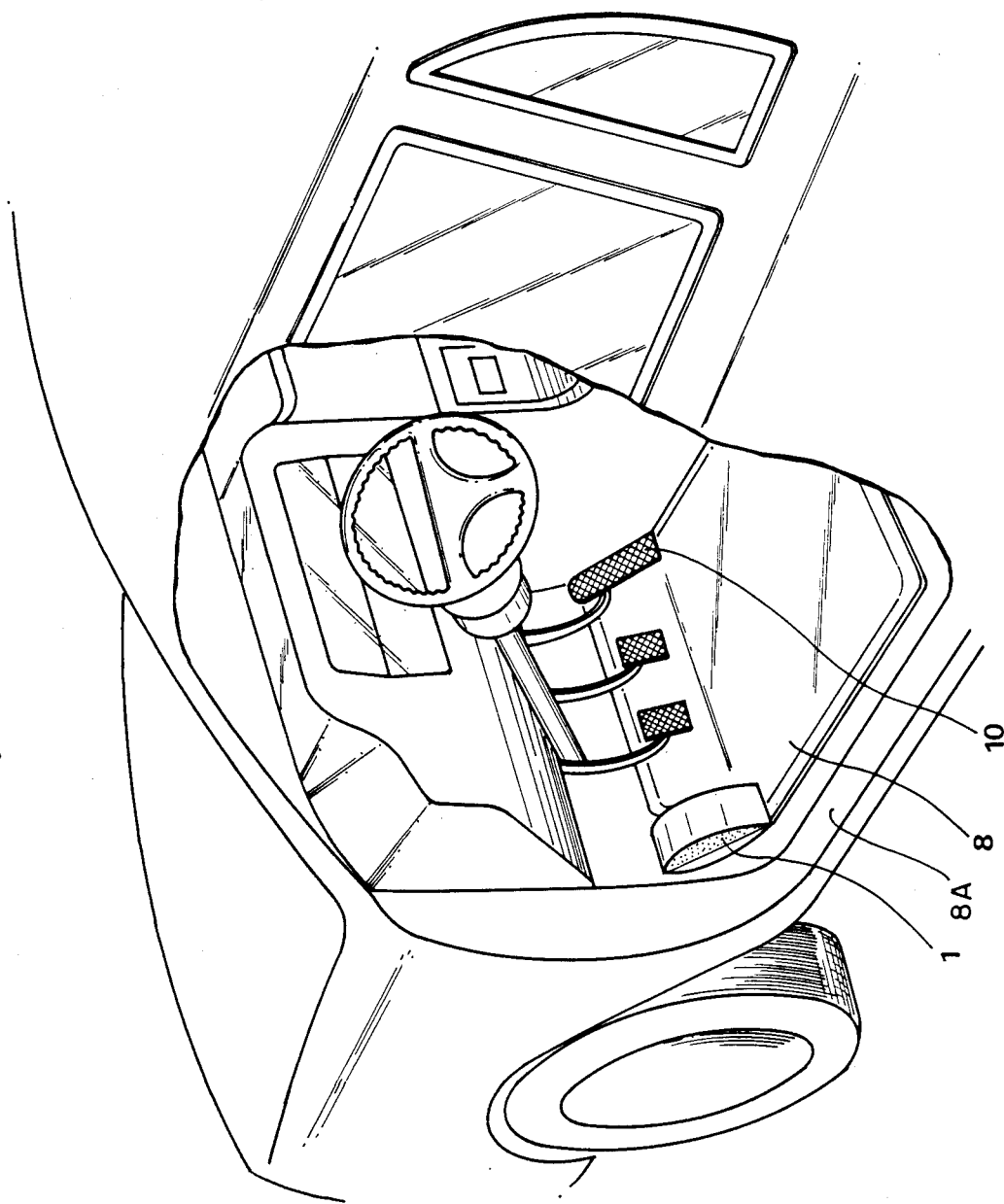
FIG. 4 illustrates the footrest according to an embodiment of the present invention in use; and Similar reference characters refer to similar parts throughout the several views of the drawings.

FIG. 4 illustrates an automobile floor mat 8 having a footrest 1 according to the present invention which is positioned for the driver's seat of an automobile. It is preferable that the footrest 1 has the same angular position and height as the accelerator pedal 10. Therefore, while the driver drives the car, the driver's left foot is positioned on the footrest 1 and the right foot is positioned on the accelerator pedal, thereby maintaining the physical balance of the driver. However, it should be appreciated that the reason for making the angular position and height of the footrest 1 the same as those of the accelerator pedal is that when both feet are maintained at the same level, people feel most comfortable. Thus, where the accelerator is manipulated to achieve a slow speed the foot positioned on the footrest of the present invention is positioned toward the rear 20 portion of the footrest. Accordingly, at high speed the foot positioned on the footrest of the present invention is positioned toward the top 21 portion of the footrest. To achieve this effect, the foot positioned on the footrest is not required to be pushed down into the footrest Hence, the position of the driver's feet are approximately the same, yet the driver is not consciously required to maintain a steady pressure on the footrest to achieve the desired results.

As described above, if the automobile floor mats for the driver and passengers include a footrest according to the present invention, the driver and passengers feel more comfortable while traveling. Also, the floor mat according to the present invention aids in keeping the driver's posture as well as the passenger's posture in a more alert position, so that it may aid in preventing a traffic mishap.

According to the present invention, an automobile floor mat having footrest is easily secured to the floor of the car, and particularly, the position of the footrest can be adjusted depending upon the driver's or passenger's physical conditions without forming a hole in the floor mat or the floor of the car. Furthermore, the mat is detachable from the floor for easy cleaning of both the mat and the floor.

The foregoing description of the preferred embodiments has been presented for purpose of illustration and description. It is not intended to limit the scope of this invention. Many modifications and variations are possible in the light of above teaching. It is intended that the scope of the invention be defined by the claims.

What is claimed is:

1. An automobile floor mat for the floor area of an automobile, wherein said automobile utilizes a floor accelerator manipulatable by a foot of a driver of the automobile, said mat comprising:

a mat having a top and bottom and configured to be received on the floor area used by the feet of the driver of the automobile;

a footrest having a top and a bottom, said top adapted to received the driver's foot which is positioned opposite the accelerator such that said foot may be supported above the floor of the automobile at a height and angle approximating the height and angle of the foot of the driver when manipulating the accelerator; and fixing means for detachably and simultaneously securing the footrest to the top of the mat and to the floor of the automobile such that the footrest cooperates with the fixing means to aid in the prevention of sliding of the mat along the surface of the floor of the automobile.

2. The mat of claim 1 wherein said footrest top has a convex shape which upon movement of the foot of the driver along the convex surface of the footrest approximates the incline of the accelerator pedal being manipulated by the other foot of the driver such that each of the driver's feet are positioned at a similar height and angle.

3. The mat of claim 1 wherein said fixing means is a hook fabric and a loop fabric.

4. The mat of claim 3 wherein said mat further includes a notch formed therein such that in use said notch is juxtaposed the accelerator; and one of said hook and loop fabrics includes a first and a second portion with said first portion secured to said floor and said second portion secured to said mat and the remaining fabric secured to said footrest such that in use upon positioning said mat on the floor area of said automobile used by said driver said notch receives said first portion of said fabric positioned on said floor to enable said fabric secured to said bottom of said footrest to securely engage said fabric positioned on said floor and said mat thereby detachably and simultaneously securing in use said bottom of said footrest to said mat and to said floor of said automobile to thereby aid in preventing said mat from sliding along the surface of the floor of the automobile.

5. The automobile floor mat of claim 1, wherein said footrest has a laminate structure comprising a top member, an intermediate member and a bottom member and wherein a bottom surface of said top member and a top surface of said bottom member each include a plurality of protrusions for preventing separation of said intermediate member from said top member and said bottom member.

6. An automobile floor mat for the floor area of an automobile, wherein said automobile utilizes a floor accelerator manipulatable by a foot of a driver of the automobile, said mat comprising:

a mat having a top and a bottom and configured to be received on the floor area used by the feet of the driver of the automobile, said mat including a notch formed therein such that in use, said notch is juxtaposed with the accelerator;

a footrest having a top and a bottom, said top adapted to received the driver's foot which is positioned opposite the accelerator such that said foot may be supported above the floor of the automobile at a height and angle approximating the height and angle of the foot of the driver when manipulating the accelerator, said footrest top having a convex shape which upon movement of the foot of the driver along the convex surface of the footrest approximates the incline of the accelerator pedal being manipulated by the other foot of the driver such that each of the driver'feet are positioned at a similar height and angle; and fixing means for detachably and simultaneously securing said footrest to said top of said mat and to said floor of said automobile, comprising at least two hook and loop fabrics, wherein the first of said hook and loop fabrics includes a first and a second portion with said first portion secured to said floor and said second portion secured to said top of said mat and the second of said hook and loop fabrics secured to said footrest such that upon positioning said mat on the floor area of said automobile, said notch receives said first portion of said first fabric positioned on said floor to enable said second fabric secured to said bottom of said footrest to securely engage said first fabric thereby detachably securing the bottom of said footrest to said top of said mat and said bottom of said footrest to said floor of said automobile such that said footrest cooperates with said fixing means to aid in the preventing the sliding of the mat along the surface of the floor of the automobile.

7. A rear seat automobile floor mat comprising:

a mat having a top and a bottom and configured to be received on the floor area used by the feet of a passenger positioned in the rear seat of the automobile, said mat further including an aperture formed in said top of said mat;

a footrest having a top and a bottom, said top adapted to receive the passenger's feet which are positioned at said top of said mat such that said feet may be supported by said footrest above the floor of the automobile; and a fixing means for detachably and simultaneously securing the footrest to the top of the mat, comprising at least two hook and loop fabrics, wherein the first of said hook and loop fabrics includes a first and a second portion with said first portion secured to said floor and said second portion secured to said top of said mat and the second of said hook and loop fabrics secured to said footrest such that upon positioning said mat on the floor area used by said passenger, said aperture receives said first portion of said first fabric positioned on said floor to enable said second fabric secured to said bottom of said footrest to securely engage said first fabric positioned on said floor and said top of said mat, thereby detachably and simultaneously securing said bottom of said footrest to said top of said mat and said bottom of said footrest to said floor of said automobile such that said footrest cooperates with said fixing means to aid in the prevention of said mat from sliding along the surface of the floor of the automobile.

8. A rear seat automobile floor mat comprising:

a mat having a top and a bottom and configured to be received on the floor area used by the feet of a passenger positioned in the rear seat of the automobile;

a footrest having a top and a bottom, said top of said footrest adapted to receive the passenger's feet such that the passenger's feet may be supported by said footrest above said mat positioned on the floor of the automobile; and a fixing means for detachably and simultaneously securing said footrest to said top of said mat and to said floor, such that said footrest cooperates with said fixing means to aid in the prevention of the sliding of the mat along the surface of the floor of the automobile.

9. The mat of claim 8 wherein said fixing means is a hook fabric and a loop fabric.

10. The mat of claim 9 wherein said mat further includes an aperture formed in said top of said mat; and one of said hook and loop fabrics includes a first and a second portion with said first portion secured to said floor and said second portion secured to said mat and the remaining fabric secured to said footrest such that in used upon positioning said mat on the floor area of said automobile used by said passenger said aperture receives said first portion of said fabric positioned on said floor to enable said fabric secured to said bottom of said footrest to securely engage said fabric positioned on said floor and said mat thereby detachably and simultaneously securing in use said bottom of said footrest to said mat and to said floor of said automobile to thereby aid in preventing said mat from sliding along the surface of the floor of the automobile.

11. The mat of claim 8 further including a first and a second opening formed on said top of said mat for receiving a first and a second front seat support of the automobile.

* * * * *